(12) United States Patent
Odulinski et al.

(10) Patent No.: US 10,884,806 B1
(45) Date of Patent: *Jan. 5, 2021

(54) SYSTEMS AND METHODS OF OPTIMIZED TUNING OF RESOURCES

(71) Applicant: Asurvio Management, Inc., Austin, TX (US)

(72) Inventors: Bogdan Odulinski, Austin, TX (US); Brett Pany, Lakeway, TX (US)

(73) Assignee: ASURVIO, LP, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,841

(22) Filed: Sep. 11, 2019

Related U.S. Application Data

(63) Continuation of application No. 15/612,196, filed on Jun. 2, 2017, now Pat. No. 10,452,440.

(60) Provisional application No. 62/346,964, filed on Jun. 7, 2016.

(51) Int. Cl.
| | |
|---|---|
| *G06F 9/50* | (2006.01) |
| *G06F 9/54* | (2006.01) |
| *G06F 11/30* | (2006.01) |
| *G06F 11/34* | (2006.01) |

(52) U.S. Cl.
CPC ............ *G06F 9/5005* (2013.01); *G06F 9/542* (2013.01); *G06F 11/3024* (2013.01); *G06F 11/3409* (2013.01)

(58) Field of Classification Search
CPC .................................................... G06F 9/5005
See application file for complete search history.

(56) References Cited

U.S. PATENT DOCUMENTS

| | | | |
|---|---|---|---|
| 9,652,306 B1 * | 5/2017 | Wagner | ............... G06F 9/45533 |
| 2004/0143640 A1 * | 7/2004 | Rangan | .................. G06F 15/16 |
| | | | 709/212 |

\* cited by examiner

*Primary Examiner* — Sisley N Kim
(74) *Attorney, Agent, or Firm* — Winstead PC

(57) ABSTRACT

In an embodiment, a method is performed by an agent installed in a computing environment on a computer system. The method includes monitoring the computing environment for optimization triggers. The method also includes, responsive to detection of an optimization trigger, identifying an optimization profile of a plurality of optimization profiles that is applicable to the optimization trigger. In addition, the method includes temporarily modifying the computing environment in accordance with the optimization profile. Further, the method includes, responsive to the temporarily modifying, monitoring the computing environment for optimization exit triggers. Additionally, the method includes, responsive to detection of an optimization exit trigger, automatically reversing the temporarily modifying.

17 Claims, 4 Drawing Sheets

SYSTEMS AND METHODS OF OPTIMIZED TUNING OF RESOURCES

CROSS-REFERENCE TO RELATED APPLICATIONS

This patent application is a continuation application of U.S. patent application Ser. No. 15/612,196, filed on Jun. 2, 2017. U.S. patent application Ser. No. 15/612,196 claims priority from U.S. Provisional Patent Application No. 62/346,964 filed on Jun. 7, 2016. U.S. patent application Ser. No. 15/612,196 and U.S. Provisional Patent Application No. 62/346,964 are hereby incorporated by reference in their entirety.

BACKGROUND

Technical Field

The present disclosure relates generally to resource management and more particularly, but not by way of limitation, to systems and methods of optimized tuning of resources.

History of Related Art

Just as an automobile engine cannot generally be tuned to maximize both distance and speed, computing environments cannot generally be optimized for every usage scenario at the same time. For example, while some automobiles provide a 'Sport' versus 'Eco' mode to allow choice between speed and distance, as a general matter, the choice of how to optimize a computing environment must be made manually by a user.

SUMMARY OF THE INVENTION

In an embodiment, a method is performed by an agent installed in a computing environment on a computer system. The method includes monitoring the computing environment for optimization triggers. The method also includes, responsive to detection of an optimization trigger, identifying an optimization profile of a plurality of optimization profiles that is applicable to the optimization trigger. In addition, the method includes temporarily modifying the computing environment in accordance with the optimization profile. Further, the method includes, responsive to the temporarily modifying, monitoring the computing environment for optimization exit triggers. Additionally, the method includes, responsive to detection of an optimization exit trigger, automatically reversing the temporarily modifying.

In an embodiment, a system includes a computer processor and memory such that the computer processor and memory in combination are operable to implement a method that is performed by an agent installed in a computing environment on the system. The method includes monitoring the computing environment for optimization triggers. The method also includes, responsive to detection of an optimization trigger, identifying an optimization profile of a plurality of optimization profiles that is applicable to the optimization trigger. In addition, the method includes temporarily modifying the computing environment in accordance with the optimization profile. Further, the method includes, responsive to the temporarily modifying, monitoring the computing environment for optimization exit triggers. Additionally, the method includes, responsive to detection of an optimization exit trigger, automatically reversing the temporarily modifying.

In one embodiment, a computer-program product includes a non-transitory computer-usable medium having computer-readable program code embodied therein. The computer-readable program code is adapted to be executed to implement a method, the method being performed by an agent installed in a computing environment on a computer system. The method includes monitoring the computing environment for optimization triggers. The method also includes, responsive to detection of an optimization trigger, identifying an optimization profile of a plurality of optimization profiles that is applicable to the optimization trigger. In addition, the method includes temporarily modifying the computing environment in accordance with the optimization profile. Further, the method includes, responsive to the temporarily modifying, monitoring the computing environment for optimization exit triggers. Additionally, the method includes, responsive to detection of an optimization exit trigger, automatically reversing the temporarily modifying.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

For purposes of this patent application, a computing environment can refer to the environment in which physical and/or virtual computing resources are consumed, often at the direction of a user, computer process or other entity. A computing environment can include, among other things, physical and virtual computing resources, an operating system, and software applications. One way to optimize a computing environment might be to assume that a specific goal is to be achieved under specific environmental circumstances. In commercial enterprise infrastructure, for example, a server might be dedicated and tuned for specific tasks to maximize its efficiency for a given workload. When the workload changes, however, the manner in which the server was tuned can lose its effectiveness. Similarly, users who use their devices for different purposes generally discover that performance changes based on which network they are on and what application they am using.

The present disclosure describes examples of a monitoring agent that intelligently initiates optimization of a computing environment based on defined optimization triggers. For example, users generally focus on one application at any given time. For example, in some cases, the application may stream audio and/or video. In certain embodiments, the application that has focus can be optimized at start time or when the application receives focus. In these cases, application launch and/or the application's receipt of focus can be considered optimization triggers. By way of further example, users often find themselves using their applications/devices at different locations with different network characteristics. In certain embodiments, the detection of a new or different network environment/routing can also serve as an optimization trigger. Other examples of optimization triggers can include increased/decreased load, other telemetry monitored by an optimization process, combinations of same and/or the like. Advantageously, in certain embodiments, optimizations of a computing environment that are performed by a monitoring agent can be reversed or undone when an optimization exit trigger is detected.

Figure 1:
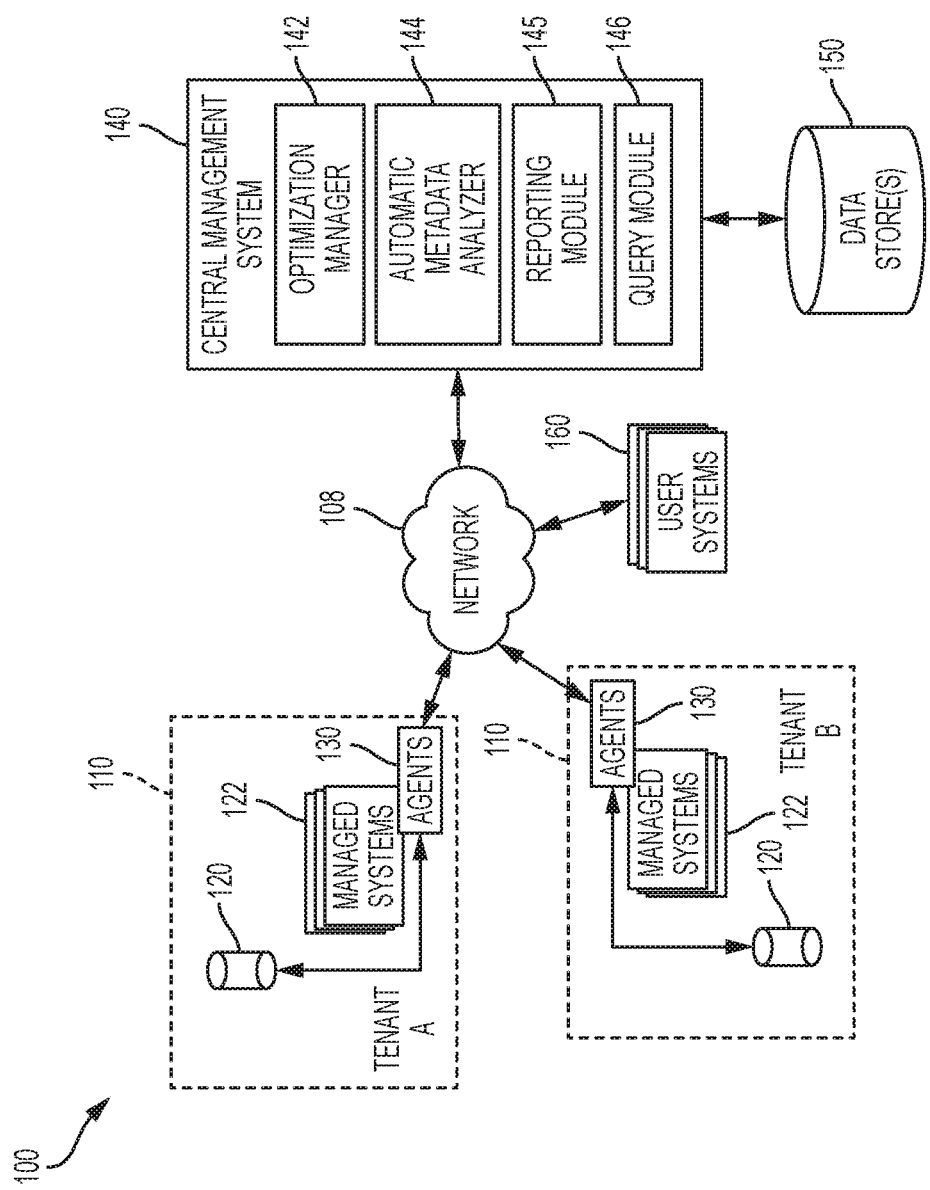
FIG. 1 illustrates an example of a system for implementing a central management system.

FIG. 1 illustrates an example of a system 100 for implementing a central management system 140. The system 100 includes the central management system 140, tenant systems 110, user systems 160 and one or more data stores 150, each of which is operable to communicate over a network 108. The network 108 may be a private network, a public network, a local or wide area network, a portion of the Internet, combinations of the same, and/or the like. Each of the tenant systems 110 can represent an installation of physical and/or virtual computing infrastructure.

In certain embodiments, the central management system 140 can centrally manage agent-initiated optimizations of computing environments, such as individual user environments and workspaces, for its tenants. In particular, in the system 100, the tenant systems 110 can be served by the central management system 140. The tenant systems 110 shown can be owned or operated by the same or different entities. For example, one of the tenant systems 110 is shown as owned or operated by "Tenant A" while another tenant system 110 is owned or operated by a different tenant, "Tenant B." For example, Tenants A and B can represent customers (e.g., entities such as companies or individuals) of an operator of the central management system 140. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more managed systems 122 and one or more local data stores 120 (hereinafter. "local data store(s) 120"). The managed systems 122 can include physical and/or virtual computing devices, such as physical machines and/or virtual machines. For instance, the managed systems 122 may include any of the following: a physical computer system, a virtual machine, server, web server, application server, database, database server, network switches or other network hardware, combinations of the same or the like. Any given tenant system 110 can include from one to several managed systems 122. For example, a tenant system 110 can represent an entire data center having hundreds or even thousands of managed systems 122. An example of a computer system that can serve as one of the managed systems 122 will be described in relation to FIG. 2.

As illustrated, the managed systems 122 can include optimization agents 130 that are installed in computing environments provided thereby. The optimization agents 130 can facilitate automatic optimization of the computing environments in accordance with optimization settings stored in the local data store(s) 120. Specifically, the optimization settings of the local data store(s) 120 can include, for example, optimization triggers, optimization profiles, optimization exit triggers, other information or settings, combinations of same and/or the like.

In general, the optimization triggers of the local data store(s) 120 can each specify an event, the occurrence of which results in a given optimization agent of the optimization agents 130 optimizing a computing environment in accordance with an associated optimization profile. Each optimization profile of the local data store(s) 120 can specify, for example, one or more services to be stopped, one or more processes to be ended, one or more environment settings to be modified, combination of same and/or the like. Each optimization exit trigger of the local data store(s) 120 can specify, for example, an event, the occurrence of which results in the given optimization agent of the optimization agents 130 proceeding to reverse or undo whatever optimization may have been performed.

In certain implementations, the optimization agents 130 can monitor for the optimization triggers specified in the local data store(s) 120. As optimization triggers are detected, the optimization agents 130 can perform particular optimizations that are specified in optimization profiles associated with the triggers. For example, the optimization agents can stop one or more services, end one or more processes, change one or more environment settings, combinations of same and/or the like. Furthermore, in certain embodiments, the optimizations applied by the optimization agents 130 can be temporary. For example, the optimization agents 130 can monitor for optimization exit triggers, upon the occurrence of which the optimization agents 130 reverse the applied optimizations, for example, by resuming stopped services, restarting ended processes, restoring changed settings, combinations of same and/or the like. In some embodiments, the optimization agents 130 can each represent two or more agents that are resident in a given computing environment. In these embodiments, the functionality of each of the optimization agents 130 can be distributed among the two or more agents. Example operation of the optimization agents 130 with respect to example optimization settings will be described in greater detail with respect to FIGS. 2-4.

In certain embodiments, the optimization settings of the local data store(s) 120 can be established at a central level by the central management system 140, at a tenant level by one or more of the tenant systems 110, and/or at an individual system or user level for individual ones of the managed systems 122. In some cases, some or all of the local data store(s) 120 can be tenant-specific such that the managed systems 122 of at least some of the tenant systems 110 can share, for example, repositories of optimization settings, some which may be customized by or for particular tenants. In some cases, some or all of the local data store(s) 120 can be system-specific such that at least some of the managed systems 122 maintain their own repositories of optimization settings, some of which may be customized for particular systems or users. In addition, or alternatively, in some embodiments, the local data store(s) 120 can be omitted such that all optimization settings are accessed directly from the central management system 140 without a local copy being retained by individual tenants or systems.

In certain embodiments, the optimization agents 130 can generate optimization metadata during the course of operation. The optimization metadata can include, for example, time-series data related to the performance of physical and/or software components, such as processor utilization, memory utilization, other resource-usage indicators, combinations of same and/or the like. The optimization metadata can also include listings of specific processes that are executing at a given point in time, system configuration data, or other data. In many cases, the optimization agents 130 can generate optimization metadata on a scheduled basis or upon the occurrence of certain events. For example, in some embodiments, the optimization agents 130 can generate optimization metadata both before and after performing optimizations specified by a given optimization profile. In that way, the identification of performance improvements, or lack thereof, can be facilitated. Optimization metadata generated by the optimization agents 130 can be stored in the local data store(s) 120 or in other memory designated for such storage.

In the illustrated embodiment, the central management system 140 can include an optimization manager 142, an automatic metadata analyzer 144, a reporting module 145 and a query module 146. Each of these components can be implemented with hardware and/or software. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

The optimization manager 142 can cause optimization agents, such as the optimization agents 130, to be installed on the managed systems 122. In some cases, the optimization agents 130 can be retrieved from the one or more data stores 150. In addition, or alternatively, the optimization manager 142 can periodically provide, from the one or more data stores 150, optimization settings to the optimization agents 130. The provided optimization settings can include, for example, optimization triggers, optimization profiles, updates to the foregoing, combinations of same and/or the like.

In addition, in some embodiments, the optimization manager 142 can serve a data collection function. For example, the optimization manager 142 can receive, from the optimization agents 130, tenant and/or user-specific optimization settings that are defined by a tenant or user. In addition, the optimization agents 130 can collect optimization metadata from the managed systems 122. This optimization metadata can include any of the optimization metadata described above. The optimization metadata that is collected can also include information about attributes, characteristics, or properties of the managed systems 122. In some cases, the optimization metadata can relate to specific optimization profiles and provide performance data for times immediately before and after a particular optimization profile was applied. Also, in some cases, the optimization metadata can characterize a performance benefit of a particular application of the optimization profile, for example, in terms of processor-utilization improvement, increased memory availability, or resources freed. The optimization agents 130 can collect some or all of the above-mentioned data or metadata in real-time, periodically, e.g., according to a schedule, on-demand, or a combination of the same. In addition, the optimization agents 130 can provide some or all of the above-mentioned data to the optimization manager 142 upon request, or, in some cases, as a live stream. The optimization manager 142 can store collected data, for example, in the one or more data stores 150.

In certain embodiments, features of the components of the central management system 140 can be made accessible over an interface to the user systems 160. For example, the optimization manager 142, or another component, can publish a configuration interface to the user systems 160, for example, for administrators, super users or other users (e.g., of a particular tenant) to select or specify commands (e.g., for adding or editing optimization settings for specific tenants or managed systems). The user systems 160 can include any type of computing device, including computer systems such as desktops, laptops, tablets, smartphones, PDAs, to name a few. The user systems 160 can be operated by users associated with the tenants or by other users.

The automatic metadata analyzer 144 can automatically identify trends in optimization metadata stored in the one or more data stores 150. For example, the automatic metadata analyzer 144 can analyze each optimization profile and the optimization metadata related to its execution. In that way, the automatic metadata analyzer 144 can identify optimization profiles that, from a statistical standpoint, achieve greatest performance improvements and isolate those optimization profiles for possible expanded use. As explained previously, the one or more data stores 150 can include optimization profiles (and corresponding optimization metadata) that represent tenant and/or system-specific customizations. Advantageously, in certain embodiments, the automatic metadata analyzer 144 can leverage such customizations to realize new performance benefits from previously unknown optimization profiles.

In addition, in some embodiments, the automatic metadata analyzer 144 can identify outlier conditions in the optimization metadata for each optimization profile represented in the one or more data stores 150. For example, if a characteristic performance improvement as represented by a given metric or composite of metrics (e.g., processor utilization, memory availability, etc.) is consistently not achieved on a specific managed system, the failure to achieve that improvement (or be within a threshold range of that improvement) may be indicative of malicious software resident on that managed system. In some implementations, the automatic metadata analyzer 144 can further analyze specific processes that are executing on that managed system and isolate one or more processes that are not characteristically present in other implementations. The automatic metadata analyzer 144 can issue notifications, for example, to a user associated with the given managed system or to an administrator.

The reporting module 145 can generate regular or on-demand reports related to the managed systems 122. In various cases, these reports can provide a snapshot of some or all of the managed systems 122. The reporting module 145 typically accesses data related to the managed systems 122 via the query module 146. The reporting module 145 can publish reports or other generated information, for example, to a web page, dashboard, and/or the like. The query module 146 can generate and execute a query of the one or more data stores 150. In various cases, the query module 146 can be triggered by and work in conjunction with the reporting module 145. The web page, user dashboard or other user interface(s) output, for example, by the reporting module 145, can be accessed by users of the user systems 160. The query module 146 can also provide a user interface, for instance, that allows the users of the user systems 160 to obtain customized data related to any data maintained by the one or more data stores 150.

In general, the one or more data stores 150 can include any information collected, stored or used by the central management system 140. For example, in various embodiments, the one or more data stores 150 can include optimization metadata and optimization settings of the type described above. In certain embodiments, some of the optimization settings of the one or more data stores 150 can be centrally established, for example, by an administrator, super user or other user with appropriate access to the central management system 140. In addition, or alternatively, the one or more data stores 150 can include optimization settings collected from the local data store(s) 120. In these scenarios, at least some optimization settings can result from tenant-specific customizations and/or user-specific customizations on the optimization agents 130. A subset of the optimization settings on the one or more data stores 150 can be designated as public, or default, for particular use cases or classifications of tenants or users. In certain embodiments, data stored in the one or more data stores 150 can take the form of repositories, flat files, databases, etc.

Figure 2:
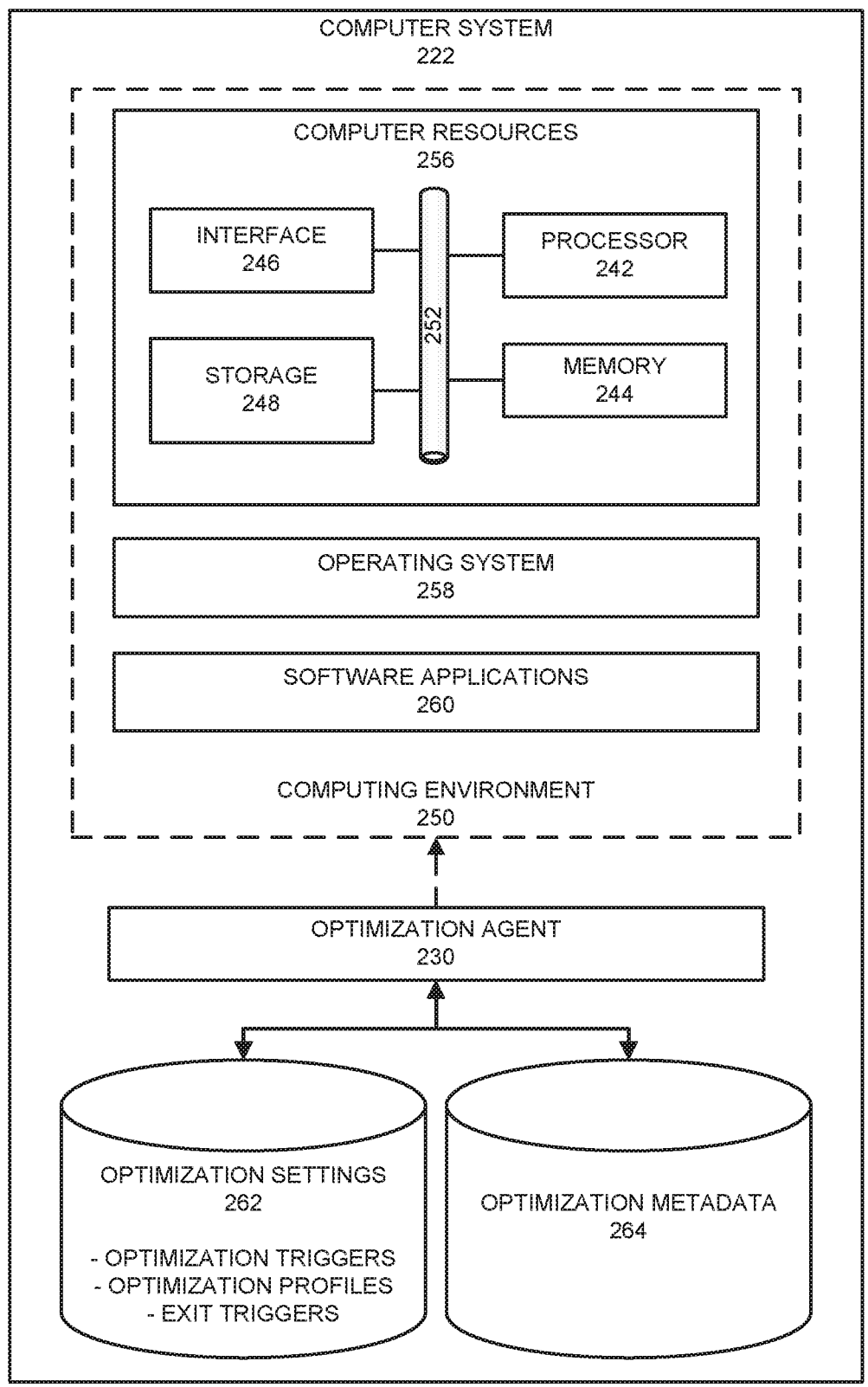
FIG. 2 illustrates an example of a computer system that, in some cases, can serve as one of the managed systems shown in FIG. 1.

FIG. 2 illustrates an example of an computer system 222 that, in some cases, can serve as one of the managed systems 122 of FIG. 1. The computer system 222 includes an optimization agent 230 operable to monitor a computing environment 250. The computing environment 250 includes computer resources 256, an operating system 258, and software applications 260. In particular embodiments, the computer system 222 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The computer resources 256 of the computer system 222 may comprise any suitable physical form, configuration, number, type and/or layout. As an example, and not by way of limitation, the computer system 222 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 222 may include one or more computer systems; be unitary or distributed; span multiple locations; span multiple machines; or reside in a cloud, which may include one or more cloud components in one or more networks.

In the depicted embodiment, the computer resources 256 include a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the operating system 258, the software applications 260, and the optimization agent 230. Such functionality may include providing various features discussed herein. In particular embodiments, processor 242 may include hardware for executing instructions, such as those making up the optimization agent 230. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor, include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include RAM. This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the computer system 222, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the computer system 222 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the computer system 222, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which computer system 222 is used. As an example and not by way of limitation, computer system 222 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 222 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 222 may include any suitable interface 246 for any one or more of these networks, where appropriate.

In some embodiments, interface 246 may include one or more interfaces for one or more I/O devices. One or more of these I/O devices may enable communication between a person and the computer system 222. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the computer system 222 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML). Extensible Markup Language (XML), or other suitable markup language.

The operating system 258 can execute on and manage the computer resources 256 as well as provide common services for computer programs. The operating system 258 can be any one of many operating systems such as, for example, a version of MICROSOFT WINDOWS, APPLE IOS or ANDROID, a distribution of LINUX, other variants of UNIX operating systems, another operating system, etc. For example, the software applications 260 can execute on the operating system 258 using the common services provided thereby.

Although not explicitly illustrated as such, the optimization agent 230 can execute on the operating system 258 as one of the software applications 260, and perform configurable optimization in accordance with optimization settings 262. During the course of its execution, the optimization agent can also generate and store optimization metadata 264 of the type described with respect to FIG. 1. In certain embodiments, the optimization settings 262 can include definitions of optimization triggers, optimization profiles, and optimization exit triggers. The optimization settings 262 and the optimization metadata 264 can reside in the storage 248 or in other memory such as, for example, one or more tenant-specific data stores that are shared across multiple managed systems. The optimization settings 262 and the optimization metadata 264 can be represented in one or more databases, one or more flat files, combinations of same and/or the like.

The optimization triggers of the optimization settings 262 can each specify an event, the occurrence of which results in the optimization agent 230 optimizing the computing environment 250 in accordance with a specified optimization profile. Each optimization profile can specify, for example, one or more services to be stopped, one or more processes to be ended, one or more environment settings to be modified, combination of same and/or the like. In implementations configured to optimize upon the launch of a software application, different optimization profiles can be used for different categories of software applications such as, for example, productivity applications (e.g., word processing, spreadsheets, etc.), audio/video streaming applications, video games, web-browser applications, etc. Each optimization exit trigger can specify, for example, an event, the occurrence of which results in the optimization agent 230 proceeding to reverse or undo whatever optimization may have been performed in accordance with a particular optimization profile.

In certain embodiments, the optimization settings 262 can associate each optimization trigger with one or more of the optimization profiles and one or more of the optimization exit triggers. Optimization triggers can include, for example, the launch of a specific application of the software applications 260, a specific application of the software applications receiving focus, the detection of a new or different network environment/routing, voice activation by a user, manual activation by a user, scheduled activation, resource usage (e.g. processor and/or memory utilization) reaching a threshold value, combinations of same and/or the like. In that way, the optimizations specified by the associated optimization profile could be performed upon the detection of the optimization trigger. Optimization exit triggers can include, for example, a launched application being closed or terminated, an in-focus software application being taken out of focus by a user, disconnection from or going out of range of a particular network, voice deactivation by a user, manual deactivation by a user, scheduled deactivation, resource usage, such as processor and/or memory utilization, reaching a threshold value, combinations of same and/or the like.

Table 1 and Table 2 below illustrate examples of tasks and services, respectively, that can be started or stopped as part of applying optimizations. For illustrative purposes, the below-referenced examples are provided with respect to a MICROSOFT WINDOWS 10 environment. However, it should be appreciated that the principles described herein are not limited to any particular operating system or computing environment.

TABLE 1

EXAMPLE TASKS

| Task Name | Description |
| --- | --- |
| GoogleUpdateTaskUserS-1-5-21-1298670002-245384297-1525907851-1001Core | Keeps GOOGLE software up to date. |
| OneDrive Standalone Update Task v2 | ONEDRIVE Update Task |
| Office Automatic Updates | This task ensures that MICROSOFT OFFICE installation can check for updates. |
| Office ClickToRun Service Monitor | This task monitors the state of MICROSOFT OFFICE ClickToRunSvc and sends crash and error logs to MICROSOFT. |
| Office Subscription Maintenance | Task used to ensure that the MICROSOFT OFFICE Subscription licensing is current. |
| Active Directory (AD) Rights Management Service (RMS) Rights Policy Template Management (Automated) | Updates the AD RMS rights policy templates for the user. This job does not provide a credential prompt if authentication to the template distribution web service on the server fails. In this case, it fails silently. |
| AD RMS Rights Policy Template Management (Manual) | Updates the AD RMS rights policy templates for the user. This job provides a credential prompt if authentication to the template distribution web service on the server fails. |
| PolicyConverter | Converts the software restriction policies policy from XML into binary format. |
| VerifiedPublisherCertStoreCheck | Inspects the AppID certificate cache for invalid or revoked certificates. |

TABLE 1-continued

EXAMPLE TASKS

| Task Name | Description |
| --- | --- |
| MICROSOFT Compatibility Appraiser | Collects program telemetry information if opted-in to the MICROSOFT Customer Experience Improvement Program. |
| ProgramDataUpdater | Collects program telemetry information if opted-in to the MICROSOFT Customer Experience Improvement Program |
| StartupAppTask | Scans startup entries and raises notification to the user if there are too many startup entries. |
| AppHostRegistrationVerifier | Verifies AppUriHandler host registrations. |
| Appuriverifierdaily | Verifies AppUriHandler host registrations. |
| Appuriverifierinstall | Verifies AppUriHandler host registrations. |
| CleanupTemporaryState | Cleans up each package's unused temporary files. |
| DsSvcCleanup | Performs maintenance for the Data Sharing Service. |
| Proxy | This task collects and uploads autochk software quality management (SQM) data if opted-in to the MICROSOFT Customer Experience Improvement Program. |
| UninstallDeviceTask | Uninstalls the PnP device associated with the specified Bluetooth service identifier (ID) |
| BgTaskRegistrationMaintenanceTask | Maintains registrations for background tasks for Universal WINDOWS Platform applications. |
| UserTask | Certificate Services Client automatically manages digital identities such as Certificates, Keys and Credentials for the users and the machine, enabling enrollment, roaming and other services. |
| UserTask-Roam | Certificate Services Client automatically manages digital identities such as Certificates, Keys and Credentials for the users and the machine, enabling enrollment, roaming and other services. |
| ProactiveScan | NTFS Volume Health Scan |
| Consolidator | If the user has consented to participate in the WINDOWS Customer Experience Improvement Program, this job collects and sends usage data to MICROSOFT. |
| KernelCeipTask | The Kernel CEIP (Customer Experience Improvement Program) task collects additional information about the system and sends this data to MICROSOFT. If the user has not consented to participate in WINDOWS CEIP, this task does nothing. |
| UsbCeip | The Universal Serial Bus (USB) CEIP (Customer Experience Improvement Program) task collects USB-related statistics and information about the machine and sends it to the WINDOWS Device Connectivity engineering group at MICROSOFT. |
| Data Integrity Scan | Scans fault-tolerant volumes for latent corruptions |
| Data Integrity Scan for Crash Recovery | Scans fault-tolerant volumes for fast crash recovery |
| ScheduledDefrag | This task optimizes local storage drives. |
| Scheduled | The WINDOWS Scheduled Maintenance Task performs periodic maintenance of the computer system by fixing problems automatically or reporting them through Security and Maintenance. |
| SilentCleanup | Maintenance task used by the system to launch a silent auto disk cleanup when running low on free disk space. |
| MICROSOFT-WINDOWS-DiskDiagnosticDataCollector | The WINDOWS Disk Diagnostic reports general disk and system information to MICROSOFT for users participating in the Customer Experience Program. |
| DmClient | Update System Initiated User Feedback (SIUF) strings |
| DmClientOnScenarioDownload | Update SIUF strings |
| Property Definition Sync | Synchronizes the File Classification Infrastructure taxonomy on the computer with the resource property definitions stored in Active Directory Domain Services. |
| File History (maintenance mode) | Protects user files from accidental loss by copying them to a backup location when the system is unattended |
| Installation | Install language components that match the user's language list. |
| Notifications | Location Notification |
| WINDOWSActionDialog | Location Notification |
| WinSAT | Measures a system's performance and capabilities |
| MapsToastTask | This task shows various Map related toasts |
| MapsUpdateTask | This task checks for updates to maps which you have downloaded for offline use. Disabling this task will prevent WINDOWS from notifying you of updated maps. |
| ProcessMemoryDiagnosticEvents | Schedules a memory diagnostic in response to system events. |
| RunFullMemoryDiagnostic | Detects and mitigates problems in physical memory (RAM). |
| MNO Metadata Parser | Mobile Broadband Account Experience Metadata Parser |
| LPRemove | Launch language cleanup tool |
| GatherNetworkInfo | Network information collector |
| WiFiTask | Background task for performing per user and web interactions |
| Background Synchronization | This task controls periodic background synchronization of Offline Files when the user is working in an offline mode. |
| Logon Synchronization | This task initiates synchronization of Offline Files when a user logs onto the system. |

TABLE 1-continued

EXAMPLE TASKS

| Task Name | Description |
| --- | --- |
| Device Install Group Policy | Device Installation Group Policy Change Handler |
| Device Install Reboot Required | Notifies the user that WINDOWS needs to be restarted in order to finish setting up a device. |
| Plug and Play Cleanup | WINDOWS keeps copies of all previously installed device driver packages from WINDOWS Update and other sources, even after installing newer versions of drivers. This task will remove older versions of drivers that are no longer needed. The most current version of each driver package will be kept. This task will also remove state used by devices that have not been detected on this system for a long period of time. |
| Sysprep Generalize Drivers | Generalize driver state in order to prepare the system to be bootable on any hardware configuration. |
| AnalyzeSystem | This task analyzes the system looking for conditions that may cause high energy use. |
| CreateObjectTask | Provides support for shell components that access system data |
| FamilySafetyMonitor | Initializes Family Safety monitoring and enforcement. |
| FamilySafetyMonitorToastTask | Synchronizes the latest settings with the MICROSOFT family features service. |
| FamilySafetyRefreskTask | Synchronizes the latest settings with the MICROSOFT family features service. |
| IndexerAutomaticMaintenance | Keeps the search index up to date |
| SpaceAgentTask | Storage Spaces Settings |
| Storage Tiers Management Initialization | Initializes the Storage Tiers Management service when the first tiered storage space is detected on the system. Do not remove or modify this task. |
| Storage Tiers Optimization | Optimizes the placement of data in storage tiers on all tiered storage spaces in the system. |
| EnableLicenseAcquisition | Enable subscription license acquisition |
| HybridDriveCachePrepopulate | Hybrid Drive cache prepopulation task |
| HybridDriveCacheRebalance | Hybrid Drive cache rebalance maintenance task |
| ResPriStaticDbSync | Reserved Priority static db sync maintenance task |
| WsSwapAssessmentTask | Working set swap assessment maintenance task |
| SR | This task creates regular system protection points. |
| Interactive | Runs a task as the interactive user. |
| ForceSynchronizeTime | This task performs time synchronization. |
| SynchronizeTime | Maintains date and time synchronization on all clients and servers in the network. If this service is stopped, date and time synchronization will be unavailable. If this service is disabled, any services that explicitly depend on it will fail to start. |
| SynchronizeTimeZone | Updates timezone information. If this task is stopped, local time may not be accurate for some time zones. |
| Refresh Settings | This task downloads settings for WINDOWS Updates. |
| Schedule Scan | This task performs a scheduled WINDOWS Update scan. |
| UpnPHostConfig | Set UPnPHost service to Auto-Start |
| WiFiTask | Background task for performing per user and web interactions |
| ResolutionHost | The WINDOWS Diagnostic Infrastructure Resolution host enables interactive resolutions for system problems detected by the Diagnostic Policy Service. It is triggered when necessary by the Diagnostic Policy Service in the appropriate user session. If the Diagnostic Policy Service is not running, the task will not run |
| WINDOWS DEFENDER Cache Maintenance | Periodic maintenance task. |
| WINDOWS DEFENDER Cleanup | Periodic cleanup task. |
| WINDOWS DEFENDER Scheduled Scan | Periodic scan task. |
| WINDOWS DEFENDER Verification | Periodic verification task. |
| QueueReporting | WINDOWS Error Reporting task to process queued reports. |
| BfeOnServiceStartTypeChange | This task adjusts the start type for firewall-triggered services when the start type of the Base Filtering Engine (BFE) is disabled. |
| UpdateLibrary | This task updates the cached list of folders and the security permissions on any new files in a user's shared media library. |
| AUScheduledInstall | Initiates scheduled install of updates on the machine. |
| AUSessionConnect | This task is used to display notifications to users. |
| Automatic App Update | Automatically updates the user's WINDOWS store applications. |
| Scheduled Start | This task is used to start the WINDOWS Update service when needed to perform scheduled operations such as scans. |
| Scheduled Start With Network | This task is used to start the WINDOWS Update service when needed to perform scheduled operations such as scans. |
| Sih | This daily task launches the SIH client (server-initiated healing) to detect and fix system components that are vital to automatic updating of WINDOWS and MICROSOFT software installed |

TABLE 1-continued

EXAMPLE TASKS

| Task Name | Description |
| --- | --- |
| | on the machine. This task can go online, evaluate applicability of healing actions, download necessary payloads to execute the actions, and execute healing actions. |
| Sihboot | This boot task launches the SIH client to finish executing healing actions to fix the system components vital to automatic updating of WINDOWS and MICROSOFT software installed on the machine. It is enabled only when the daily SIH client task fails to complete execution of applicable healing actions. This boot task never goes online and does not evaluate applicability of healing actions. |
| Automatic-Device-Join | Register this computer if the computer is already joined to an Active Directory domain. |
| NotificationTask | Background task for performing per user and web interactions |
| XblGameSaveTask | XblGameSave Standby Task |
| XblGameSaveTaskLogon | XblGameSave Logon Task |
| SqmUpload_S-1-5-21-1298670002-245384297-1525907851-1001 | This task uploads CEIP data for Portable Devices |

TABLE 2

EXAMPLE SERVICES

| Service Name (Registry) | DEFAULT STATE WINDOWS 10 Home | DEFAULT STATE WINDOWS 10 Pro | "Optimized" State |
| --- | --- | --- | --- |
| AxInstSV | Manual | Manual | Manual |
| AJRouter | Manual (Trigger Start) | Manual (Trigger Start) | Disabled |
| AppReadiness | Manual | Manual | Manual |
| Hvsics | Not Available | Not Installed (Automatic, Trigger Start) | Not Installed |
| AppHostSvc | Not Installed (Automatic, Started) | Not Installed (Automatic, Started) | Not installed |
| AppIDSvc | Manual (Trigger Start) | Manual (Trigger Start) | Manual (Trigger Start) |
| Appinfo | Manual (Trigger Start, Started) | Manual (Trigger Start, Started) | Manual (Trigger Start, Started) |
| ALG | Manual | Manual | Disabled |
| AppMgmt | Not Available | Manual | Manual |
| AppXSVC | Manual | Manual | Manual |
| aspnet_state | Not Installed (Manual) | Not Installed (Manual) | Not Installed |
| Tzautoupdate | Disabled | Disabled | Disabled |
| Background Intelligent Transfer Service (BITS) | Manual or Automatic (Delayed Start, Started) depending on other services | Manual or Automatic (Delayed Start, Started) depending on other services | Automatic (Delayed Start, Started) |
| BrokerInfrastructure | Automatic (Started) | Automatic (Started) | Automatic |
| BFE | Automatic (Started) | Automatic (Started) | Automatic |
| BDESVC | Manual (Trigger Start) | Manual (Trigger Start) | Manual (Trigger Start) |
| wbengine | Manual | Manual | Manual |
| BthHFSrv | Manual (Trigger Start) | Manual (Trigger Start) | Disabled |
| bthserv | Manual (Trigger Start) | Manual (Trigger Start) | Disabled |
| PeerDistSvc | Not Available | Manual | Disabled |
| CertPropSvc | Manual | Manual | Disabled |
| c2wts | Not Installed (Manual) | Not Installed (Manual) | Not Installed |
| NfsClnt | Not Available | Not Available | Disabled |
| ClipSVC | Manual (Trigger Start) | Manual (Trigger Start) | Manual (Trigger Start) |
| KeyIso | Manual (Trigger Start, Started) | Manual (Trigger Start, Started) | Manual (Trigger Start) |
| EventSystem | Automatic (Started) | Automatic (Started) | Automatic |
| COMSysApp | Manual | Manual | Manual |
| Browser | Manual (Trigger Start) | Manual (Trigger Start) | Manual (Trigger Start) |

TABLE 2-continued

EXAMPLE SERVICES

| Service Name (Registry) | DEFAULT STATE WINDOWS 10 Home | DEFAULT STATE WINDOWS 10 Pro | "Optimized" State |
|---|---|---|---|
| CDPSvc | Automatic (Delayed Start, Trigger Start) | Automatic (Delayed Start, Trigger Start) | Automatic (Delayed Start, Trigger Start) |
| CDPUserSvc | Automatic (Started) | Automatic (Started) | Manual |
| DiagTrack | Automatic (Started) | Automatic (Started) | Automatic |
| PimIndexMaintenanceSvc | Manual | Manual | Disabled |
| CoreUIRegistrar | Automatic (Started) | Automatic (Started) | Automatic |
| VaultSvc | Manual | Manual | Manual |
| CryptSvc | Automatic (Started) | Automatic (Started) | Automatic |
| DsSvc | Manual (Trigger Start) | Manual (Trigger Start) | Manual (Trigger Start) |
| DcpSvc | Manual (Trigger Start) | Manual (Trigger Start) | Manual (Trigger Start) |
| DcomLaunch | Automatic (Started) | Automatic (Started) | Automatic |
| DoSvc | Automatic (Delayed Start) | Automatic (Delayed Start) | Automatic (Delayed Start) |
| DeviceAssociationService | Manual (Trigger Start, Started) | Manual (Trigger Start, Started) | Manual (Trigger Start) |
| DeviceInstall | Manual (Trigger Start) | Manual (Trigger Start) | Manual (Trigger Start) |
| DmEnrollmentSvc | Manual | Manual | Manual |
| DsmSVC | Manual (Trigger Start) | Manual (Trigger Start) | Manual (Trigger Start) |
| DevicesFlowUserSvc_????? | Manual | Manual | Manual |
| DevQueryBroker | Manual (Trigger Start) | Manual (Trigger Start) | Manual (Trigger Start) |
| Dhcp | Automatic (Started) | Automatic (Started) | Automatic |
| DPS | Automatic (Started) | Automatic (Started) | Automatic |
| WdiServiceHost | Manual (Started) | Manual (Started) | Manual |
| WdiSystemHost | Manual | Manual | Manual |
| TrkWks | Automatic (Started) | Automatic (Started) | Disabled |
| MSDTC | Manual | Manual | Manual |
| dmwappushsvc | Manual (Trigger Start) | Manual (Trigger Start) | Disabled |
| Dnscache | Automatic (Trigger Start, Started) | Automatic (Trigger Start, Started) | Automatic (Trigger Start) |
| MapsBroker | Automatic (Delayed Start) | Automatic (Delayed Start) | Disabled |
| DsRoleSvc | Not Available | Not Installed (Manual) | Not installed |
| DusmSvc | Automatic (Started) | Automatic (Started) | Disabled |
| embeddedmode | Manual (Trigger Start) | Manual (Trigger Start) | Manual (Trigger Start) |
| EFS | Manual (Trigger Start) | Manual (Trigger Start) | Manual (Trigger Start) |
| EntAppSvc | Manual | Manual | Manual |
| EapHost | Manual | Manual | Manual |
| Fax | Manual | Manual | Uninstalled |
| fhsvc | Manual (Trigger Start) | Manual (Trigger Start) | Manual (Trigger Start) |
| fdPHost | Manual (Started) | Manual (Started) | Manual |
| FDResPub | Manual (Started) | Manual (Started) | Manual |
| lfsvc | Manual (Trigger Start, Started) | Manual (Trigger Start, Started) | Disabled |
| gpsvc | Automatic (Trigger Start) | Automatic (Trigger Start) | Automatic (Trigger Start) |
| hkmsvc | Not Available | Manual | Disabled |
| HomeGroupListener | Manual | Manual | Manual |
| HomeGroupProvider | Manual (Trigger Start, Started) | Manual (Trigger Start, Started) | Manual (Trigger Start) |

TABLE 2-continued

EXAMPLE SERVICES

| Service Name (Registry) | DEFAULT STATE WINDOWS 10 Home | DEFAULT STATE WINDOWS 10 Pro | "Optimized" State |
|---|---|---|---|
| hns | Not Available | Not Installed (Manual) | Not Installed |
| hidserv | Manual (Trigger Start) | Manual (Trigger Start) | Manual (Trigger Start) |
| HvHost | Manual (Trigger Start) | Manual (Trigger Start) | Disabled |
| vmickvpexchange | Manual (Trigger Start) | Manual (Trigger Start) | Disabled |
| vmicguestinterface | Manual (Trigger Start) | Manual (Trigger Start) | Disabled |
| vmicshutdown | Manual (Trigger Start) | Manual (Trigger Start) | Disabled |
| vmicheartbeat | Manual (Trigger Start) | Manual (Trigger Start) | Disabled |
| vmcompute | Not Available | Not Installed (Manual, Trigger Start, Started) | Not Installed |
| vmicvmsession | Manual (Trigger Start) | Manual (Trigger Start) | Disabled |
| vmicrdv | Manual (Trigger Start) | Manual (Trigger Start) | Disabled |
| vmictimesync | Manual (Trigger Start) | Manual (Trigger Start) | Disabled |
| vmms | Not Available | Not Installed (Automatic, Started) | Not Installed |
| vmicvss | Manual (Trigger Start) | Manual (Trigger Start) | Disabled |
| IISADMIN | Not Installed (Automatic, Started) | Not Installed (Automatic, Started) | Not Installed |
| IKEEXT | Manual (Trigger Start) | Manual (Trigger Start) | Manual (Trigger Start) |
| irmon | Manual | Manual | Disabled |
| UI0Detect | Manual | Manual | Manual |
| SharedAccess | Manual (Trigger Start) | Manual (Trigger Start) | Disabled |
| iphlpsvc | Automatic (Started) | Automatic (Started) | Disabled |
| IpxlatCfgSvc | Manual (Trigger Start) | Manual (Trigger Start) | Disabled |
| PolicyAgent | Manual (Trigger Start) | Manual (Trigger Start) | Manual (Trigger Start) |
| KtmRm | Manual (Trigger Start) | Manual (Trigger Start) | Manual (Trigger Start) |
| lltdsvc | Manual | Manual | Manual |
| LSM | Automatic (Started) | Automatic (Started) | Automatic |
| wlpasvc | Manual (Trigger Start) | Manual (Trigger Start) | Disabled |
| LPDSVC | Not Installed (Automatic, Started) | Not Installed (Automatic, Started) | Not Installed |
| LxssManager | Not Installed (Manual) | Not Installed (Manual) | Not Installed |
| MSMQ | Not Installed (Automatic, Started) | Not Installed (Automatic, Started) | Not Installed |
| MSMQTriggers | Not Installed (Automatic, Started) | Not Installed (Automatic, Started) | Not Installed |
| MessagingService | Manual (Trigger Start) | Manual (Trigger Start) | Manual (Trigger Start) |
| diagnosticshub.standardcollector.service | Manual | Manual | Disabled |
| wlidsvc | Manual (Trigger Start) | Manual (Trigger Start) | Manual (Trigger Start) |
| AppVClient | Not Available | Disabled | Disabled |
| ftpsvc | Not Installed (Automatic, Started) | Not Installed (Automatic, Started) | Not Installed |
| MSiSCSI | Manual | Manual | Disabled |
| MsKeyboardFilter | Not Installed (Disabled) | Not Installed (Disabled) | Not Installed |
| NgcSvc | Manual (Trigger Start) | Manual (Trigger Start) | Manual (Trigger Start) |
| NgcCtnrSvc | Manual (Trigger Start) | Manual (Trigger Start) | Manual (Trigger Start) |
| swprv | Manual (Started at boot, then stops) | Manual (Started at boot, then stops) | Manual |
| smphost | Manual | Manual | Manual |
| SmsRouter | Manual (Trigger Start) | Manual (Trigger Start) | Disabled |
| WmsRepair | Not Available | Not Installed (Automatic, Started) | Not Installed |
| Wms | Not Available | Not Installed (Automatic, Started) | Not Installed |
| NaturalAuthentication | Manual | Manual | Disabled |
| NetMsmqActivator | Not Installed (Automatic, Started) | Not Installed (Automatic, Started) | Not Installed |
| NetPipeActivator | Not Installed (Automatic, Started) | Not Installed (Automatic, Started) | Not Installed |

TABLE 2-continued

EXAMPLE SERVICES

| Service Name (Registry) | DEFAULT STATE WINDOWS 10 Home | DEFAULT STATE WINDOWS 10 Pro | "Optimized" State |
|---|---|---|---|
| NetTcpActivator | Not Installed (Automatic, Started) | Not Installed (Automatic, Started) | Not Installed |
| NetTcpPortSharing | Disabled (Changed to Manual and Started if the previous 3 Services are installed) | Disabled (Changed to Manual and Started if the previous 3 Services are installed) | Uninstalled |
| Netlogon | Manual | Manual | Disabled |
| NcdAutoSetup | Manual (Trigger Start, Started) | Manual (Trigger Start, Started) | Disabled |
| NcbService | Manual (Trigger Start, Started) | Manual (Trigger Start, Started) | Disabled |
| Netman | Manual | Manual | Manual |
| NcaSVC | Manual (Trigger Start) | Manual (Trigger Start) | Manual |
| netprofm | Manual (Started) | Manual (Started) | Manual |
| NlaSvc | Automatic (Started) | Automatic (Started) | Automatic |
| NetSetupSvc | Manual (Trigger Start) | Manual (Trigger Start) | Manual (Trigger Start) |
| nsi | Automatic (Started) | Automatic (Started) | Automatic |
| CscService | Not Available | Manual (Trigger Start) | Disabled |
| defragsvc | Manual | Manual | Manual |
| SEMgrSvc | Manual (Trigger Start) | Manual (Trigger Start) | Disabled |
| PNRPsvc | Manual | Manual | Manual |
| p2psvc | Manual | Manual | Manual |
| p2pimsvc | Manual | Manual | Manual |
| PerfHost | Manual | Manual | Manual |
| pla | Manual | Manual | Manual |
| PhoneSvc | Manual (Trigger Start) | Manual (Trigger Start) | Disabled |
| PlugPlay | Manual (Started) | Manual (Started) | Manual |
| PNRPAutoReg | Manual | Manual | Manual |
| WPDBusEnum | Manual (Trigger Start) | Manual (Trigger Start) | Manual (Trigger Start) |
| Power | Automatic (Started) | Automatic (Started) | Automatic |
| Spooler | Automatic (Started) | Automatic (Started) | Automatic |
| PrintNotify | Manual | Manual | Manual |
| wercplsupport | Manual | Manual | Manual |
| PcaSvc | Automatic (Started) | Automatic (Started) | Automatic (Started) |
| QWAVE | Manual | Manual | Manual |
| RmSvc | Manual | Manual | Disabled |
| RasAuto | Manual | Manual | Manual |
| RasMan | Manual | Manual | Manual |
| SessionEnv | Manual (Maybe Started when using Remote Desktop) | Manual (Maybe Started when using Remote Desktop) | Disabled |
| TermService | Manual (Maybe Started when using Remote Desktop) | Manual (Maybe Started when using Remote Desktop) | Disabled |
| UmRdpService | Manual (Maybe Started when using Remote Desktop) | Manual (Maybe Started when using Remote Desktop) | Disabled |
| RpcSs | Automatic (Started) | Automatic (Started) | Automatic |
| RpcLocator | Manual | Manual | Disabled |
| RemoteRegistry | Disabled | Disabled | Disabled |
| RetailDemo | Manual | Manual | Disabled |
| iprip | Not Installed (Automatic, Started) | Not Installed (Automatic, Started) | Not Installed |
| RemoteAccess | Disabled | Disabled | Disabled |
| RpcEptMapper | Automatic (Started) | Automatic (Started) | Automatic |
| seclogon | Manual | Manual | Manual |
| SstpSvc | Manual | Manual | Manual |
| SamSs | Automatic (Started) | Automatic (Started) | Automatic |
| wscsvc | Automatic (Delayed Start, Started) | Automatic (Delayed Start, Started) | Automatic (Delayed Start) |
| SensorDataService | Manual (Trigger Start) | Manual (Trigger Start) | Disabled |
| SensrSvc | Manual (Trigger Start) | Manual (Trigger Start) | Disabled |
| SensorService | Manual (Trigger Start) | Manual (Trigger Start) | Disabled |
| LanmanServer | Automatic (Started) | Automatic (Started) | Automatic |
| shpamsvc | Disabled | Disabled | Disabled |
| ShellHWDetection | Automatic (Started) | Automatic (Started) | Automatic |
| simptcp | Not Installed (Automatic, Started) | Not Installed (Automatic, Started) | Not Installed |
| SCardSvr | Disabled | Disabled | Disabled |

TABLE 2-continued

EXAMPLE SERVICES

| Service Name (Registry) | DEFAULT STATE WINDOWS 10 Home | DEFAULT STATE WINDOWS 10 Pro | "Optimized" State |
|---|---|---|---|
| ScDeviceEnum | Manual (Trigger Start) | Manual (Trigger Start) | Disabled |
| SCPolicySvc | Manual | Manual | Disabled |
| SNMP | Not Installed (Automatic, Started) | Not Installed (Automatic, Started) | Not Installed |
| SNMPTRAP | Manual | Manual | Disabled |
| sppsvc | Automatic (Delayed Start, Trigger Start) | Automatic (Delayed Start, Trigger Start) | Automatic (Delayed Start, Trigger Start) |
| svsvc | Manual (Trigger Start) | Manual (Trigger Start) | Manual (Trigger Start) |
| SSDPSRV | Manual (Started) | Manual (Started) | Manual |
| StateRepository | Manual (Started) | Manual (Started) | Manual |
| WiaRpc | Manual | Manual | Manual |
| StorSvc | Manual (Trigger Start) | Manual (Trigger Start) | Disabled |
| TieringEngineService | Manual | Manual | Manual |
| SysMain | Automatic (Started) | Automatic (Started) | Automatic |
| OneSyncSvc | Automatic (Delayed Start) | Automatic (Delayed Start) | Automatic (Delayed Start) |
| SENS | Automatic (Started) | Automatic (Started) | Automatic |
| SystemEventsBroker | Automatic (Trigger Start, Started) | Automatic (Trigger Start, Started) | Automatic (Trigger Start) |
| Schedule | Automatic (Started) | Automatic (Started) | Automatic |
| lmhosts | Manual (Trigger Start, Started) | Manual (Trigger Start, Started) | Manual (Trigger Start, Started) |
| TapiSrv | Manual | Manual | Manual |
| Themes | Automatic (Started) | Automatic (Started) | Automatic |
| tiledatamodelsvc | Automatic (Started) | Automatic (Started) | Automatic |
| TimeBroker | Manual (Trigger Start, Started) | Manual (Trigger Start, Started) | Manual (Trigger Start) |
| TokenBroker | Manual (Started) | Manual (Started) | Manual (Started) |
| TabletInputService | Manual (Trigger Start) | Manual (Trigger Start) | Disabled |
| UwfServcingSvc | Not Available | Not Installed (Disabled) | Not Installed |
| UsoSvc | Manual (Started) | Manual (Started) | Manual (Started) |
| upnphost | Manual | Manual | Manual |
| UserDataSvc | Manual | Manual | Manual |
| UnistoreSvc | Manual | Manual | Manual |
| UevAgentService | Not Available | Disabled | Disabled |
| UserManager | Automatic (Trigger Start, Started) | Automatic (Trigger Start, Started) | Automatic (Trigger Start) |
| ProfSvc | Automatic (Started) | Automatic (Started) | Automatic |
| vds | Manual | Manual | Manual |
| VSS | Manual | Manual | Manual |
| W3LOGSVC | Not Installed (Manual) | Not Installed (Manual) | Not Installed |
| WalletService | Manual | Manual | Manual |
| WMSVC | Not Installed (Manual) | Not Installed (Manual) | Not Installed |
| WebClient | Manual (Trigger Start) | Manual (Trigger Start) | Disabled |
| WFDSConSvc | Manual (Trigger Start) | Manual (Trigger Start) | Disabled |
| AudioSrv | Automatic (Started) | Automatic (Started) | Automatic |
| AudioEndpointBuilder | Automatic (Started) | Automatic (Started) | Automatic |
| SDRSVC | Manual | Manual | Manual |
| WbioSrvc | Manual (Trigger Start) | Manual (Trigger Start) | Disabled |
| FrameServer | Manual | Manual | Disabled |
| wcncsvc | Manual | Manual | Disabled |
| Wcmsvc | Automatic (Trigger Start, Started) | Automatic (Trigger Start, Started) | Automatic (Trigger Start) |
| Sense | Not Available | Manual | Manual |
| WdNisSvc | Manual (Started) | Manual (Started) | Manual (Started) |
| WinDefend | Automatic (Started) | Automatic (Started) | Automatic |
| wudfsvc | Manual (Trigger Start, Started) | Manual (Trigger Start, Started) | Manual (Trigger Start, Started) |

TABLE 2-continued

EXAMPLE SERVICES

| Service Name (Registry) | DEFAULT STATE WINDOWS 10 Home | DEFAULT STATE WINDOWS 10 Pro | "Optimized" State |
|---|---|---|---|
| WEPHOSTSVC | Manual (Trigger Start) | Manual (Trigger Start) | Manual (Trigger Start) |
| WerSvc | Manual (Trigger Start) | Manual (Trigger Start) | Manual (Trigger Start) |
| Wecsvc | Manual | Manual | Manual |
| EventLog | Automatic (Started) | Automatic (Started) | Automatic |
| MpsSvc | Automatic (Started) | Automatic (Started) | Automatic |
| FontCache | Automatic (Started) | Automatic (Started) | Automatic |
| StiSvc | Manual | Manual | Manual |
| wisvc | Manual | Manual | Disabled |
| msiserver | Manual | Manual | Manual |
| LicenseManager | Manual (Trigger Start) | Manual (Trigger Start) | Manual (Trigger Start) |
| Winmgmt | Automatic (Started) | Automatic (Started) | Automatic |
| WMPNetworkSvc | Manual | Manual | Disabled (Uninstalled) |
| icssvc | Manual (Trigger Start) | Manual (Trigger Start) | Disabled |
| TrustedInstaller | Manual | Manual | Manual |
| Wms | Not Available | Automatic (Started) | Disabled |
| WmsRepair | Not Available | Automatic (Started) | Disabled |
| FontCache3.0.0.0 | Not Installed (Manual) | Not Installed (Manual) | Not Installed |
| WAS | Not Installed (Manual, Started) | Not Installed (Manual, Started) | Not Installed |
| WpnService | Automatic (Started) | Automatic (Started) | Automatic (Started) |
| WpnUserService | Manual | Manual | Manual |
| WinRM | Manual | Manual | Disabled |
| WSearch | Automatic (Delayed Start, Started) | Automatic (Delayed Start, Started) | Automatic (Delayed Start) |
| SecurityHealthService | Automatic (Started) | Automatic (Started) | Automatic (Started) |
| spectrum | Manual (Trigger Start) | Manual (Trigger Start) | Disabled |
| W32Time | Manual (Trigger Start) | Manual (Trigger Start) | Manual (Trigger Start) |
| wuauserv | Manual (Trigger Start) | Manual (Trigger Start) | Manual (Trigger Start) |
| WinHttpAutoProxySvc | Manual (Started) | Manual (Started) | Manual |
| dot3svc | Manual | Manual | Manual |
| WlanSvc | Manual (Automatic with Wireless Card Installed) | Manual (Automatic with Wireless Card Installed) | Manual (Automatic with Wireless Card Installed) |
| wmiApSrv | Manual | Manual | Manual |
| workfolderssvc | Manual | Manual | Uninstalled |
| LanmanWorkstation | Automatic (Started) | Automatic (Started) | Automatic |
| W3SVC | Not Installed (Automatic, Started) | Not Installed (Automatic, Started) | Not Installed |
| WwanSvc | Manual | Manual | Disabled |
| XblAuthManager | Manual | Manual | Disabled |
| XblGameSave | Manual (Trigger Start) | Manual (Trigger Start) | Disabled |
| XboxNetApiSvc | Manual | Manual | Disabled |

Table 3 below illustrates an example of an optimization scenario for video or movie watching. According to the example of Table 3, the launch of a video or movie-watching application could serve as an optimization trigger. Further, the optimization trigger can be associated with an optimization profile that specifies a defined set of optimization steps which are particular to video or movie watching. Further, according to the example of Table 3, the closing of the video or movie-watching application can serve as an exit trigger that causes the optimizations to be reversed.

TABLE 3

EXAMPLE OPTIMIZATION SCENARIO: VIDEO OR MOVIE WATCHING

| | |
|---|---|
| Description | Defines a particular set of operating system services to pause/stop, scheduled tasks to defer, applications to close, network parameters optimized for streaming, and silencing of any notification systems that could interrupt the video or movie watching experience. |
| Optimization Trigger | Launch of one or more specified movie applications or movie-viewing web services (e.g. WINDOWS MEDIA PLAYER and NETFLIX, respectively) |
| Optimizations Applied Upon Optimization Trigger (From Optimization Profile) | 1. Stop background file indexing services to increase available central processing unit (CPU) processing and reduce disk I/O load (e.g., WSearch from Table 2 above)<br>2. Stop update related operating system services from downloading patches thereby ensuring all network bandwidth resources are available to stream video content (e.g., WINDOWS Update (wuauserv) and Background Intelligent Transfer Service (BITS) from Table 2 above)<br>3. Stop any application/service that could impact the streaming flow of movie related data packets. This could include closing of any other network-dependent software that may be memory-resident at the time.<br>4. Prevent/Pause all operating system scheduled tasks from launching (e.g., See Table 1 above).<br>   E.g., GOOGLE and ONEDRIVE update tasks from Table 1 above.<br>   E.g., any task scheduled to run in the next 8 hours based on Date column<br>5. Close all previously launched memory resident applications.<br>   E.g., MICROSOFT WORD, MICROSOFT EXCEL, ADOBE PHOTOSHOP.<br>6. Prevent system and software notifications from being displayed.<br>   E.g., Stop WINDOWS notification services such as Printer Extensions and Notifications, System Event Notification, WINDOWS Push Notifications System Service.<br>   E.g., Close SKYPE, email, and other communication applications that can create desktop notifications.<br>7. Scan current network conditions and optimize network software based on detected conditions. |
| Exit Trigger | Closing the media player or movie-viewing web service. |
| Reversals Applied Upon Exit Trigger | 1. Restart background file indexing services and update services.<br>2 . Re-enable operating system's patch-related services.<br>3. Re-Launch previously closed network-dependent applications.<br>4. Un-Pause scheduled tasks previously paused.<br>5. Re-Launch previously closed memory resident applications.<br>6. Re-Enable notification systems.<br>7. Re-scan network and adjust network parameters for general use based on currently detected conditions. |

In similar fashion, Table 4 below illustrates an example of an optimization scenario for photo editing. According to the example of Table 4, the launch of a photo-editing application could serve as an optimization trigger. As described previously, the optimization trigger can be associated with an optimization profile that specifies a defined set of optimization steps which are particular to photo editing. Further, according to the example of Table 4, the closing of the photo-editing application can serve as an exit trigger that causes the optimizations to be reversed.

TABLE 4

EXAMPLE OPTIMIZATION SCENARIO: PHOTO EDITING

| | |
|---|---|
| Description | Defines a particular set of operating system services to pause/stop, scheduled tasks to defer, and a small subset of applications to close, but leaves notification systems on for email, chat, and collaboration. |
| Optimization Trigger | Launch of a photo-editing application such as ADOBE PHOTOSHOP. |
| Optimizations Applied Upon Optimization Trigger | 1. Stop non-essential processor-intensive operating system services to free up CPU and memory resources available for photo editing (e.g., apply the 'Optimized' settings to the list of WINDOWS services).<br>2. Close applications not relevant to photo editing (e.g. games such Sudoku, Solitaire, etc.) to free up additional resources.<br>3. Optimize available photo editing software operational parameters to reflect detected system capabilities. |
| Exit Trigger | Closing the photo-editing application. |
| Reversals Applied Upon Exit Trigger | 1. Restart previously stopped operating system services.<br>2. Restart previously closed applications.<br>3. Restore photo-editing software parameters to previous values. |

Figure 3:
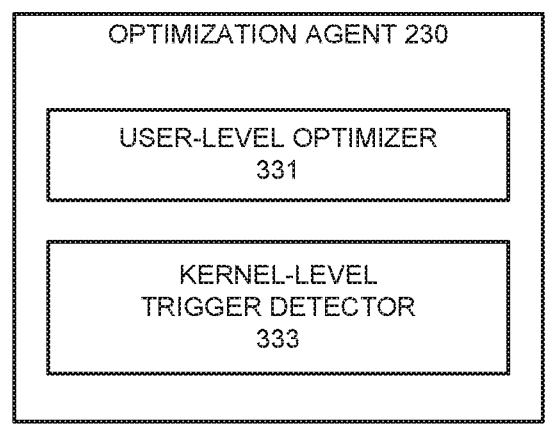
FIG. 3 illustrates an optimization agent in more detail.

FIG. 3 illustrates the optimization agent 230 in more detail. The optimization agent 230 includes a user-level optimizer 331 and a kernel-level trigger detector 333. In certain embodiments. CPUs provide a plurality of operating modes that place various restrictions on the type and scope of operations that can be performed. In certain embodiments, consumer user applications execute in a mode in which access to hardware or memory is restricted, often referred to as "user mode." For example, in various cases, applications executing in user mode may have no direct access to hardware or memory so that, instead, such applications must utilize system application programming interfaces to access hardware or memory. In contrast, the operating system and low-level, trusted operating-system functions may execute in an unrestricted mode, often referred to as "kernel mode."

Although consumer user applications typically execute in user mode, these applications are typically instantiated by the operating system in kernel mode. For instance, when loading an application, the operating system, in kernel mode, typically first copies an executable image into RAM, creates a main application thread, and performs other initialization steps. Advantageously, in certain embodiments, the kernel-level trigger detector 333 can execute in the kernel mode so as to detect kernel-level events such as, for example, the copy of an executable image into RAM, the creation of a main application thread, and/or other initialization steps. In that way, the kernel-level trigger detector 333 can detect the initiation of an application, identify an appropriate optimization profile, and apply optimizations before the application has a chance to run. In general, the user-level optimizer 331 and the kernel-level trigger detector 333 can be considered two distinct software agents that collectively constitute the optimization agent 230.

Figure 4:
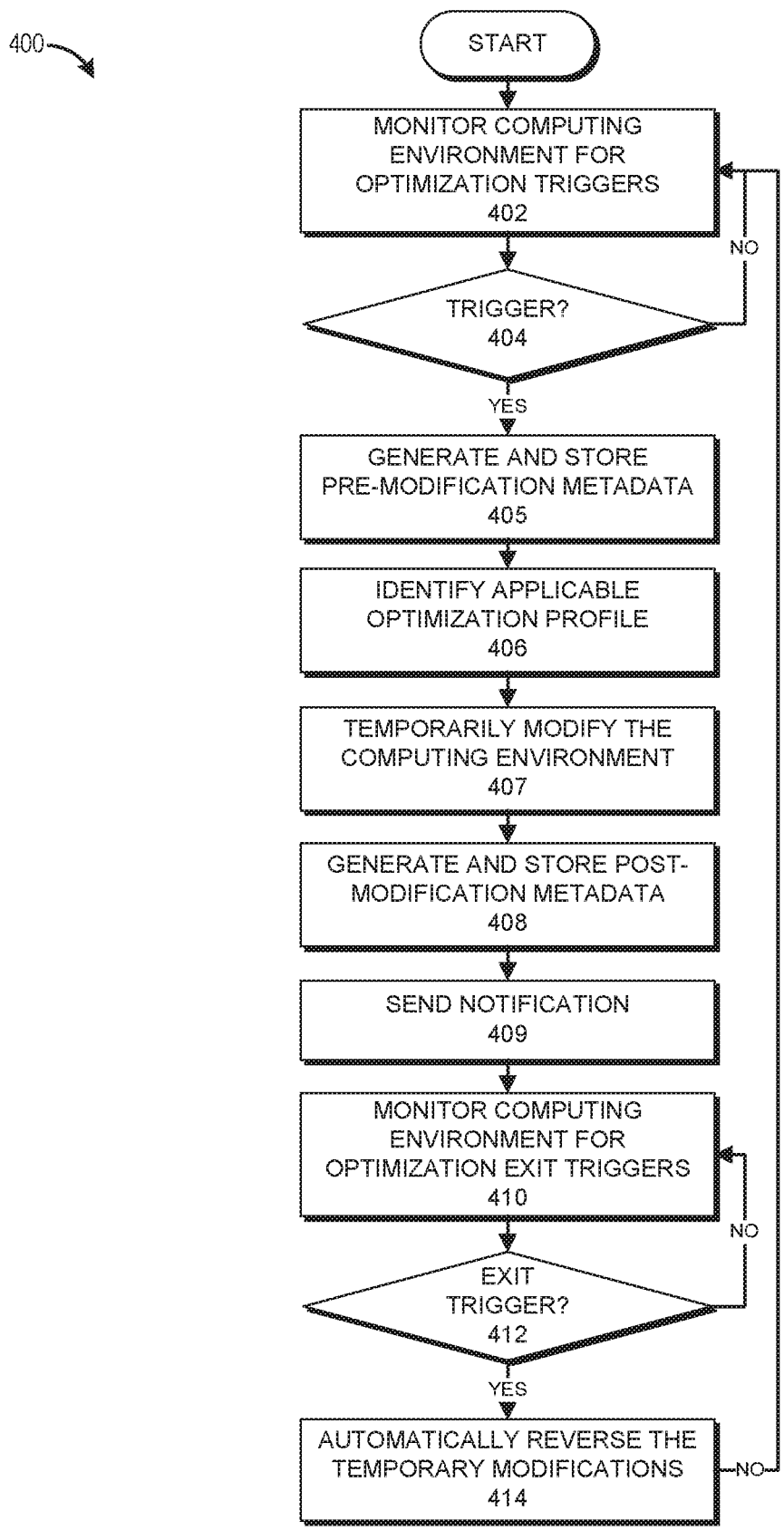
FIG. 4 illustrates an example of a process for performing agent-initiated optimization on a managed system.

FIG. 4 illustrates an example of a process 400 for performing agent-initiated optimization on a managed system such as, for example, one of the managed systems 122 of FIG. 1 and/or the computer system 222 of FIG. 2. In certain embodiments, the process 400 can be initiated on-demand by an administrator, super user or other user for a monitored system (e.g., via the user systems 160 in communication with the central management system 140 and the managed systems 122, both of FIG. 1). The process 400 can be implemented by any system that can provide a computing environment. For example, the process 400, in whole or in part, can be implemented by the central management system 140, one or more of the managed systems 122, one or more of the optimization agents 130, the computer system 222, the optimization agent 230, the user-level optimizer 331, the kernel-level trigger detector 333, a component of the foregoing, and/or the like. In some cases, the process 400 can be performed generally by the system 100 of FIG. 1. Although any number of systems, in whole or in part, can implement the process 400, to simplify discussion, the process 400 will be described in relation to the computer system 222 of FIG. 2.

At block 402, the kernel-level trigger detector 333 monitors the computing environment 250 for optimization triggers that are specified in the optimization settings 262. For example, with reference to Tables 3 and 4 above, the block 402 could include monitoring for the launch of a movie-watching application or web service and the launch of a photo-editing application. More particularly, the block 402 can include monitoring for kernel-level events of the type described above that are indicative of such launches. In various embodiments, the kernel-level trigger detector 333 and/or the user-level optimizer 331 can periodically generate optimization metadata of the type described in relation to FIG. 1 as the computing environment 250 is monitored.

At decision block 404, the kernel-level trigger detector 333 determines whether an optimization trigger has been detected. If not, the process 400 returns to block 402 and the kernel-level trigger detector 333 continues to monitor the computing environment 250 for optimization triggers. Otherwise, if it is determined at decision block 404 that an optimization trigger has been detected, the process 400 proceeds to block 405. Advantageously, in certain embodiments, as discussed above, the optimization trigger can be a kernel-level event that allows optimization to occur, for example, before an application responsible for the trigger (e.g., a movie-watching or photo-editing application) begins running.

At block 405, the user-level optimizer 331 generates and stores pre-modification optimization metadata. The pre-modification optimization metadata can include any of the example optimization metadata described in relation to FIG. 1, with the pre-modification optimization metadata serving as a performance snapshot of the computer system 222 before any optimization is performed. Any pre-modification optimization metadata that is generated can be stored, for example, among the optimization metadata 264.

At block 406, the user-level optimizer 331 identifies, from the optimization settings 262, an optimization profile that is applicable to the detected optimization trigger. For example, with reference to the examples of Tables 3 and 4 above, if the detected optimization trigger is the launch of a movie-watching or photo-editing application, the user-level optimizer 331 can identify the corresponding movie-watching or photo-editing optimization profile that is associated in memory with the detected optimization trigger.

At block 407, the user-level optimizer 331 temporarily modifies the computing environment in accordance with the identified optimization profile. For example, the block 407 can include stopping one or more services, ending one or more processes, changing one or more settings, combinations of same and/or the like. In an example, with respect to movie-watching and photo-editing scenarios, the block 407 could include performing the optimization steps shown in Tables 3 and 4, respectively. In some embodiments, the block 407 can include storing or caching information related to how to reverse whatever modifications are made at block 407 (e.g., a prior state of changed settings). In certain embodiments, the modifications made at block 407 are considered temporary because, as described in greater detail below, the user-level optimizer 331 and/or the kernel-level trigger detector 333 can thereafter monitor for exit triggers that result in the modifications performed at block 407 being reversed or undone.

At block 408, the user-level optimizer 331 generates and stores post-modification optimization metadata. The post-modification optimization metadata can include any of the example optimization metadata described in relation to FIG. 1, with the post-modification optimization metadata serving as a performance snapshot of the computer system 222 after optimization is performed. Any post-modification optimization metadata that is generated can be stored, for example, among the optimization metadata 264. At block 409, the user-level optimizer 331 can send a notification regarding the modifications to a user of the computer system 222. The notification can be, for example, a notification on a user interface provided by the user-level optimizer 331, a popup notification, an email, an instant message, combinations of same and/or the like.

At block 410, the kernel-level trigger detector 333 and/or the user-level optimizer 331 monitors the computing environment 250 for optimization exit triggers that are specified in the optimization settings 262. For example, according to the examples of Tables 3 and 4 above, the block 410 could include monitoring for the closing of a movie-watching or photo-editing application, as applicable. In various embodiments, the user-level optimizer 331 can periodically generate optimization metadata of the type described in relation to FIG. 1 as the computing environment 250 is monitored for exit triggers.

At decision block 412, the kernel-level trigger detector 333 and/or the user-level optimizer 331 determines whether an optimization exit trigger has been detected. If not, the process 400 returns to block 410 and the kernel-level trigger detector 333 and/or the user-level optimizer 331 continues to monitor the computing environment 250 for optimization exit triggers. Otherwise, if it is determined at decision block 412 that an optimization exit trigger has been detected, the process 400 proceeds to block 414.

At block 414, the user-level optimizer 331 reverses the temporary modifications to the computing environment 250 that were made at block 407. For example, in movie-watching or photo-editing scenarios, the block 414 could include performing the reversal steps shown in Tables 3 and 4 above, respectively. From block 414, the process 400 returns to block 402, where the kernel-level trigger detector 333 again monitors for optimization triggers. In certain embodiments, the process 400 can continue to execute until terminated by a user or administrator, a computer process or an entity in communication with the computer system 222, or whenever other suitable termination criteria is satisfied.

For example, in some embodiments, a reboot of the computer system 222 can result in the process 400 terminating and any optimizations being reversed.

Although the process 400 is described and illustrated as being executed in a particular sequence, the blocks of the process 400 need not be executed in that sequence. For example, although the generation of optimization metadata is illustrated at blocks 405 and 410, some or all of the metadata can also be created, for example, at any point before optimization, concurrent to optimization, or after optimization. By way of further example, in certain embodiments, discrete steps of generating optimization metadata can omitted if, for example, optimization meta data is periodically generated as a matter of course while monitoring for optimization triggers or optimization exit triggers. Other rearrangements of the blocks of FIG. 4 will be apparent to one skilled in the art after reviewing the present disclosure.

Furthermore, although the process 400 is illustrated as using an optimization agent that distributes certain functionality between a kernel-level trigger detector and a user-level optimizer, it should be appreciated that the same functionality could be also be allocated to a single agent or to three or more agents. For example, in some embodiments, a single agent executing at the user level or the kernel level could incorporate all of the functionality described above with respect to the user-level optimizer 331 and the kernel-level trigger detector 333.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others. "can," "might." "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system comprising a computing environment:
    detecting an optimization trigger in the computing environment using a kernel-level agent executing in a kernel mode of a central processing unit (CPU) of the computer system, wherein the kernel mode of the CPU provides unrestricted access to at least some hardware and memory of the computer system;
    responsive to the detecting the optimization trigger, identifying, via a user-level agent executing in a user-level mode of the CPU, an optimization profile of a plurality of optimization profiles that is applicable to the optimization trigger, wherein the user-level mode of the CPU restricts access to the at least some hardware and memory of the computer system;
    storing pre-modification metadata, the pre-modification metadata comprising data related to performance in the computing environment;
    subsequent to the storing ore-modification metadata, temporarily modifying the computing environment in accordance with the optimization profile using the user-level agent executing in the user-level mode of the CPU;
    subsequent to the temporarily modifying, storing post-modification metadata, the post-modification metadata comprising data related to performance in the computing environment after the temporarily modifying is performed;
    detecting an optimization exit trigger using the kernel-level agent executing in the kernel mode of the CPU; and
    responsive to the detecting the optimization exit trigger, automatically reversing the temporarily modifying using the user-level agent executing in the user-level mode of the CPU.

2. The method of claim 1, wherein:
    the temporarily modifying comprises stopping a service provided by an operating system to computer programs in the computing environment; and
    the reversing the temporarily modifying comprises resuming the service.

3. The method of claim 1, wherein:
    the temporarily modifying comprises ending a process executing in the computing environment; and
    the reversing the temporarily modifying comprises restarting the process.

4. The method of claim 1, comprising identifying, via the pre-modification metadata and the post-modification metadata, one or more of the plurality of optimization profiles that achieve greatest performance improvements.

5. The method of claim 1, wherein the optimization trigger comprises a kernel-level event that is detected before an application responsible for the optimization trigger begins running.

6. The method of claim 1, comprising notifying a user of the computer system in response to the temporarily modifying.

7. A system comprising a processor and memory, wherein the processor and the memory in combination are operable to implement a method, the method being performed in a computing environment on the system, the method comprising:

detecting an optimization trigger in the computing environment using a kernel-level agent executing in a kernel mode of the processor, wherein the kernel mode of the processor provides unrestricted access to at least some hardware and memory of the system;

responsive to the detecting the optimization trigger, identifying, via a user-level agent executing in a user-level mode of the processor, an optimization profile of a plurality of optimization profiles that is applicable to the optimization trigger, wherein the user-level mode of the processor restricts access to the at least some hardware and memory of the system;

storing pre-modification metadata, the pre-modification metadata comprising data related to performance in the computing environment;

subsequent to the storing pre-modification metadata, temporarily modifying the computing environment in accordance with the optimization profile using the user-level agent executing in the user-level mode of the processor;

subsequent to the temporarily modifying, storing post-modification metadata, the post-modification metadata comprising data related to performance in the computing environment after the temporarily modifying is performed;

responsive to the temporarily modifying, monitoring the computing environment for an optimization exit trigger using the kernel-level agent executing in the kernel mode of the processor; and responsive to detection of the optimization exit trigger via the kernel-level agent executing in the kernel mode of the processor, automatically reversing the temporarily modifying using the user-level agent executing in the user-level mode of the processor.

8. The system of claim 7, wherein:
the temporarily modifying comprises stopping a service provided by an operating system to computer programs in the computing environment; and
the reversing the temporarily modifying comprises resuming the service.

9. The system of claim 7, wherein:
the temporarily modifying comprises ending a process executing in the computing environment; and
the reversing the temporarily modifying comprises restarting the process.

10. The system of claim 7, the method comprising identifying, via the pre-modification metadata and the post-modification metadata, one or more of the plurality of optimization profiles that achieve greatest performance improvements.

11. The system of claim 7, wherein the optimization trigger comprises a kernel-level event that is detected before an application responsible for the optimization trigger begins running.

12. The system of claim 7, the method comprising notifying a user of the system in response to the temporarily modifying.

13. A computer-program product comprising a non-transitory computer-usable medium having computer-readable program code embodied therein, the computer-readable program code adapted to be executed to implement a method, the method being performed by a computer system comprising a computing environment, the method comprising:
detecting an optimization trigger in the computing environment using a kernel-level agent executing in a kernel mode of a central processing unit (CPU) of the computer system, wherein the kernel mode of the CPU provides unrestricted access to at least some hardware and memory of the computer system;

responsive to the detecting the optimization trigger, identifying, via a user-level agent executing in a user-level mode of the CPU, an optimization profile of a plurality of optimization profiles that is applicable to the optimization trigger, wherein the user-level mode of the CPU restricts access to the at least some hardware and memory of the computer system;

storing pre-modification metadata, the pre-modification metadata comprising data related to performance in the computing environment;

subsequent to the storing pre-modification metadata, temporarily modifying the computing environment in accordance with the optimization profile using the user-level agent executing in the user-level mode of the CPU;

subsequent to the temporarily modifying, storing post-modification metadata, the post-modification metadata comprising data related to performance in the computing environment after the temporarily modifying is performed;

detecting an optimization exit trigger using the kernel-level agent executing in the kernel mode of the CPU; and responsive to the detecting the optimization exit trigger, automatically reversing the temporarily modifying using the user-level agent executing in the user-level mode of the CPU.

14. The computer-program product of claim 13, wherein:
the temporarily modifying comprises stopping a service provided by an operating system to computer programs in the computing environment; and
the reversing the temporarily modifying comprises resuming the service.

15. The computer-program product of claim 13, wherein:
the temporarily modifying comprises ending a process executing in the computing environment; and
the reversing the temporarily modifying comprises restarting the process.

16. The computer-program product of claim 13, the method comprising identifying, via the pre-modification metadata and the post-modification metadata, one or more of the plurality of optimization profiles that achieve greatest performance improvements.

17. The computer-program product of claim 13, wherein the optimization trigger comprises a kernel-level event that is detected before an application responsible for the optimization trigger begins running.

\* \* \* \* \*

UNITED STATES PATENT AND TRADEMARK OFFICE
CERTIFICATE OF CORRECTION

PATENT NO. : 10,884,806 B1  
APPLICATION NO. : 16/567841  
DATED : January 5, 2021  
INVENTOR(S) : Bogden Odulinski et al.

Page 1 of 1

It is certified that error appears in the above-identified patent and that said Letters Patent is hereby corrected as shown below:

In the Claims

Column 34, Line 24 In Claim 1, Replace:
"ore-modification"
With:
--pre-modification--

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*